US008142665B2

(12) United States Patent
(10) Patent No.: US 8,142,665 B2
Bruchertseifer et al.
(45) Date of Patent: Mar. 27, 2012

(54) FAST REDUCTION OF IODINE SPECIES TO IODIDE

(75) Inventors: Horst Bruchertseifer, Frick (CH); Salih Guentay, Untersiggenthal (CH)

(73) Assignee: Paul Scherrer Institut, Villigen (CH)

( * ) Notice: Subject to any disclaimer, the term of this patent is extended or adjusted under 35 U.S.C. 154(b) by 643 days.

(21) Appl. No.: 12/084,461

(22) PCT Filed: Aug. 17, 2006

(86) PCT No.: PCT/EP2006/008103

§ 371 (c)(1),
(2), (4) Date: May 1, 2008

(87) PCT Pub. No.: WO2007/051503

PCT Pub. Date: May 10, 2007

(65) Prior Publication Data

US 2009/0127202 A1 May 21, 2009

(30) Foreign Application Priority Data

Nov. 1, 2005 (EP) .................................... 05023808
Dec. 22, 2005 (EP) .................................... 05028134

(51) Int. Cl.
*C02F 1/42* (2006.01)
*C02F 1/70* (2006.01)

(52) U.S. Cl. ......... 210/682; 210/683; 210/757; 376/313

(58) Field of Classification Search .................. 210/682, 210/683, 757; 423/501; 376/313
See application file for complete search history.

(56) References Cited

U.S. PATENT DOCUMENTS

| | | | | |
|---|---|---|---|---|
| 3,767,776 | A * | 10/1973 | Bradford | 423/475 |
| 4,204,908 | A | 5/1980 | Michaelis et al. | |
| 4,275,045 | A | 6/1981 | Anav et al. | |
| 4,362,660 | A | 12/1982 | Partridge et al. | |
| 4,461,711 | A * | 7/1984 | Behrens | 210/757 |
| 4,595,529 | A | 6/1986 | Neace | |
| 5,619,545 | A * | 4/1997 | Grummon et al. | 376/195 |
| 5,632,898 | A * | 5/1997 | Jung et al. | 210/656 |
| 6,596,168 | B2 * | 7/2003 | Johnson et al. | 210/510.1 |

FOREIGN PATENT DOCUMENTS

| | | | |
|---|---|---|---|
| CA | 1077458 | A1 | 5/1980 |
| CA | 1078143 | A1 | 5/1980 |
| DE | 26 44 657 | A1 | 4/1978 |
| DE | 31 12 076 | A1 | 11/1982 |

(Continued)

OTHER PUBLICATIONS

Zdenek Dloughy, Disposal of Radioactive Wastes, 1982, Elsevier Scientific Publishing Co., p. 124.*

(Continued)

*Primary Examiner* — Matthew Savage
(74) *Attorney, Agent, or Firm* — Laurence A. Greenberg; Werner H. Stemer; Ralph E. Locher

(57) ABSTRACT

In a method of fast reduction of all iodine species, exclusively, including all volatile iodine species, into non-volatile iodide ions in an aqueous solution, a reducing agent and a co-agent with phase transfer catalyst—ion-exchanger property are simultaneously added to the aqueous solution and concurrently, thermal and radiolytic oxidation of iodide ions, otherwise yielding to revolatilzation, is suppressed producing an efficient retention of all iodide species in the aqueous solution.

7 Claims, 3 Drawing Sheets

FOREIGN PATENT DOCUMENTS

EP 0 555 996 A2 8/1993

OTHER PUBLICATIONS

Derwent Abstract—DE-31 12 076 A1; Nov. 25, 1982; Buchler GmbH, D-3300 Braunschweig, Germany.

Derwent Abstract—DE 26 44 657 A1; Apr. 20, 1978; Werner Schulz, D-4000 Duesseldorf, Germany.

Chinese Office Action dated Apr. 20, 2011.

Bruschertseifer et al: "Analysis of Iodine Species in Aqueous Solutions", Analytical and Bioanalytical Chemistry, vol. 375, Mar. 29, 2003, pp. 1107-1110.

* cited by examiner

FAST REDUCTION OF IODINE SPECIES TO IODIDE

CROSS-REFERENCE TO RELATED APPLICATIONS

The present application is a national stage application of International Application No. PCT/EP2006/008103, filed on Aug. 17, 2006, which claims priority to European Patent Application Nos. 05023808.8, filed on Nov. 1, 2006, and 05028134.4, filed on Dec. 22, 2005, which are incorporated herein by reference.

BACKGROUND OF THE INVENTION

The present invention relates to a method for an effective iodine retention in aqueous solutions.

Gaseous radioactive iodine, especially the $^{131}I$ radionuclide, poses a health hazard due to its easy and almost irreversible transport to the human thyroid gland, where it can locally induce cancer. Radioactive iodine species are therefore harmful compounds which constitute a remarkable thread in nuclear power generation. As for an example, during a severe accident in a nuclear power plant (NPP), it is anticipated that a core melt will release gaseous radioactive iodine into the reactor containment atmosphere. In the event of a failure of the vent filters or a containment leak, radioactive iodine will escape into the environment. Furthermore, during normal operation, iodine may also be released from leaking fuel elements into the primary coolant system and, in the case of a boiling water reactor; iodine could contaminate the steam turbines. Hence during maintenance, radioactive iodine could be potentially released into the turbine hall with subsequent exposure of personnel.

A large number of iodine compounds exist, but the most prominent iodine species are iodide, iodate and the volatile compounds molecular iodine ($I_2$) and organic iodides (RI). Many organic iodides could potentially form in containment, but methyl iodide ($CH_3I$) is the most volatile. So far, in nuclear power generation do not exist suitable procedures to avoid the unintended release of iodine species despite the fact that a demand for the capture of iodine species has been observed for a long time.

SUMMARY OF THE INVENTION

It is therefore the aim of the present invention to provide a method for an active and reliable retention of iodine species which have been set free as a collateral damage in nuclear power generation.

Accordingly, one aspect involves a method for a retention of iodine species which are comprised in an aqueous solution. A nucleophilic agent or a mixture of a plurality of nucleophilic agents is added to the aqueous solution. Further, a soluble ion-exchanger agent or a mixture of a plurality of soluble ion-exchanger agents is added to the aqueous solution.

This features generate an effective method for the retention of iodine species. By adding a nucleophilic agent or a mixture of nucleophilic agents to the aqueous solution $I_2$, RI and iodate are reduced to non-volatile iodide ions in a wide range of temperatures and pH and by adding the soluble ion-exchanger or a mixture of soluble ion-exchanger, the iodide ions are effectively bound to prevent their potential re-oxidation to volatile iodine species especially at low pH and under fierce irradiation which usually occurs with failures in nuclear power generation.

In order to accelerate the efficiency of the method the afore-mentioned steps a) and b) can be carried out simultaneously.

Suitable nucleophilic agents can be selected from a group containing sodium thiosulphate, $Na_2S_2O_3$, $N_2H_5OH$, $NH_2OH$, $H_2C_2H_4SH$, $(NH_4)_2S$, sodium formate.

A preferred soluble ion-exchanger can be a long-chain amine, preferably a long-chain quaternary amine.

Especially when the afore-mentioned steps a) and b) are carried out simultaneously sodium thiosulphate can be used as a preferred nucleophilic agent and trioctylmethylammonium chloride can be used as a preferred soluble ion-exchanger agent.

For the use and service of the part of a nuclear power plant, it is essential that the iodine species can be removed entirely from the containment and the equipment which have been contamined. It is therefore very helpful when a step c) is carried out after the steps a) and b) comprising the step of filtering the aqueous solution with a solid phase inorganic material. Suitable solid phase inorganic material can be selected from a group containing $SiO_2$, $Al_2O_3$, $TiO_2$ and tuff or a mixture thereof.

The method according to the present invention is used to execute strategies and procedures to manage iodine sources under severe accident conditions by retaining iodine in reactor containment. Goals were also made to ensure efficient binding of iodine-loaded additives on suitable solid phases. The disposal of such radioactive waste is now completely simplified.

Several applications can now be covered by applying the afore-mentioned method in adaptation to the respective case.

As a first scenario a hazardous break-down, such as a core melt in a nuclear power plant, can be considered. Huge amounts of gaseous compounds are generated due to the overheating of the core. These gaseous compounds have to released to the environment in order to avoid the burst of the dry well. Now, these gaseous compounds can be deducted to a pressure relief filter where the step a) and b) can be carried in the pressure relief filter. Iodine species are now effectively absorbed in the pressure relief filter and are therefore not released into the environment.

As a second scenario for the application of the inventive method a leakage of a mantle rod of a fuel rod can be considered. The aqueous solution contained in the reactor pressure vessel can be treated according the steps of the present invention which again allow a complete retention of the iodine species, for example for servicing purposes. Afterwards, the fierce irradiation destroys the material with hold back the iodine species. This materials do not harm the chemistry of the now closed and operating nuclear power generation system.

As a third scenario, a hazardous break-down is again considered where contamined water and gas penetrate the dry well. It is therefore possible to depose the nucleophilic agents and the soluble ion-exchanger within the reactor pressure vessel. Additionally, an aqueous solution containing the nucleophilic agent and the soluble ion-exchanger can be sprayed into the reactor pressure vessel for reducing and binding the iodine species.

As a fourth scenario, the situation between the turbine and generator in a nuclear power plant during normal operation shall be considered. The steam usually contains a certain load of iodine species which also penetrates the glands disposed between the turbine and the generator. When rinsing the volume between the turbine and the generator, for example for servicing purposes, the rinsing gas contains iodine species and will therefore be treated according to the method set out in the present invention.

In the scope of a fifth scenario falls a damage within the turbine containment which will cause a valve to shut-down the steam transport to the turbine. Again, the turbine containment has to be rinsed in order to shorten the period of decay for the decontamination of the turbine components. By rinsing the turbine containment with a rinsing gas, such as air, the contaminded air can be treated accordingly as explained for the fourth scenario.

A sixth scenario is related to the breakage of a heat exchanger rod within the steam generator. The heat exchanger rod constitutes part of the primary cooling circuit. Since the steam in the primary cooling circuit is under a pressure in the range of 150 bar and the ambient pressure in the steam generator lays in the range of 60 bar only, the significant pressure gradient will cause the steam of the primary cooling circuit to regorge into the steam generator ambient. A treatment according to the present invention will now provide dosing the nucleophilic agent and the soluble ion-exchanger directly into the water of the secondary cooling circuit when the breakage of a hot rod in the primary cooling circuit is detected.

Another scenario ($7^{th}$) is related to applying the method according to the present invention directly within the condenser for the retention of the iodine species. The condensed water may contain the nucleophilic agent and the soluble ion-exchanger agent.

BRIEF DESCRIPTION OF THE SEVERAL VIEWS OF THE DRAWINGS

Examples of the present invention and tables of the experimental results are discussed hereinafter. Thereby.

Table 1 comprises the experimental data showing comparative $CH_3I$ decomposition rates in aqueous mixtures of additives.

DETAILED DESCRIPTION OF THE INVENTION

Figure 1:
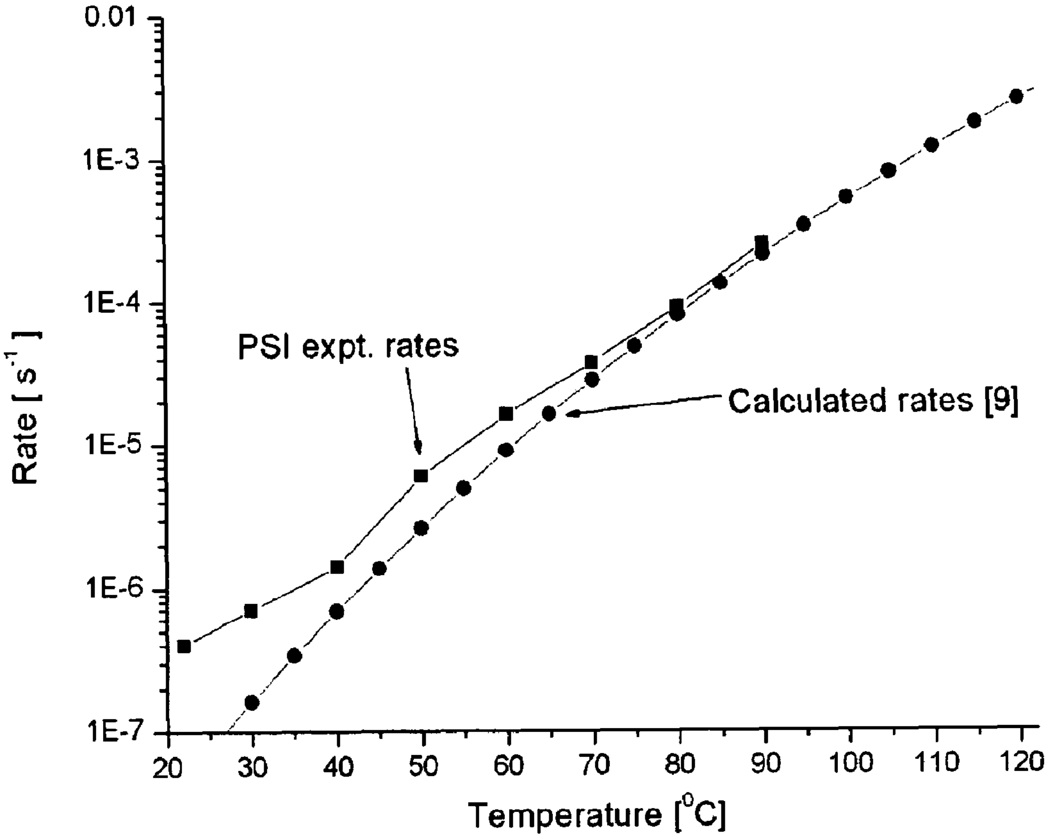
FIG. 1 shows the experimental and predicted temperature dependence of the $CH_3I$ hydrolysis rate.

Dissolved $I_2$ and $CH_3I$ are rapidly decomposed into non-volatile iodide ions by introducing nucleophilic agents, such as the commonly used sodium thiosulphate (THS). However, the $CH_3I$ mass transfer rate from solution into the gas phase can be very competitive for efficient iodine species reduction in solution.

Our experiments have demonstrated that $CH_3I$ is not completely removed from rising gas bubbles in a column of basic solution containing sodium thiosulphate, because the bubble residence time (several seconds) is still too short to compensate for slower decomposition in the boundary layer on the bubble surface. Similarly, large fraction of $CH_3I$, introduced into unstirred sodium thiosulphate solutions, diffuses rapidly, especially at higher temperatures (>120° C.), into the atmosphere. We therefore investigated the need for attaining a still faster $CH_3I$ decomposition rates with nucleophilic agents.

To track $CH_3I$ decomposition and to check the overall mass balance, radio-tracer technique was utilised since it provides sufficient sensitivity for measurements when near complete decomposition was expected. $CH_3{}^{131}I$ was prepared by isotopic exchange between liquid $CH_3I$ (1 ml) and a few drops carrier free $^{131}I$ tracer in alkaline solution. The solution mixture, after standing for two days to complete isotopic exchange, was gently shaken with an inactive KI solution and with several aliquots of water to obtain iodide-free $CH_3{}^{131}I$ for preparation of stock aqueous solutions.

Experiments were performed using glass septum bottles, gas regulation and sampling systems. $CH_3{}^{131}I$ and $Cs^{131}I$ aqueous solutions in a range of concentrations ($4\cdot10^{-5}$ to $1\cdot10^{-3}$ M), pH (3 to 9) and temperatures (22 to 90° C.) were reacted with a broad range of nucleophilic compounds, e.g., $Na_2S_2O_3$, $N_2H_5OH$, $NH_2OH$, $H_2C_2H_4SH$ and $(NH_4)_2S$. Other additives which modify the radiolytic conditions, such as sodium formate, were also tested. The $CH_3I$/nucleophile concentration ratios were varied. The effects of other ions, which may influence the $CH_3I$ decomposition efficiency and fixation process, such as, chloride from decomposed cables in containment sumps, were also investigated.

After a predetermined reaction period, volatile iodine products were removed by bubbling gas through the solution by piercing the septum cap with two syringe needles. One is connected to a gas supply and the other is connected to cartridges containing solid-phase sorbents for activity counting. Some reaction solutions were also irradiated at a dose rate of $0.4\ Gy\cdot s^{-1}$ in a γ-cell.

To enhance the $CH_3I$ decomposition rate, soluble compounds such as long-chain quaternary amines (e.g. Aliquat 336) were tested by addition to the nucleophiles. They possess the dual property of enhancing the nucleophilic reaction rate by acting as a phase transfer catalyst as well as acting as an ion-exchanger to absorb the reaction product (iodide) to prevent its re-oxidation. Tests were also performed to determine the radiolytic stability of the reaction partners separately, i.e., irradiated additives in boric acid and borate solutions as well as to determine the radiolytic decomposition efficiency (G-value) of irradiated $CH_3I$ solutions. The effect of number of carbon atoms in long-chain quaternary amines on decomposition rate was also investigated.

Simple and quick analytical methods based on selective adsorption, solid state extraction or ion-exchange were developed using materials in cartridge form to determine the main iodine species, i.e., $CH_3I$, and $I_2$, $IO_3^-$ and $I^-$ in the gas and aqueous phase samples.

Dedicated experiments were conducted on $CH_3I$ hydrolysis and radiolytic decomposition under broad range of temperature and dose respectively in order to create a baseline data to establish the relative increase in the decomposition rate by using additives.

This method according to the present invention, developed as a result of the experiments carried out at PSI, is based on simultaneous use of a strong reducing substance and long chain quaternary amines. Sodium thiosulphate and trioctylmethylammonium chloride, commercially known as Aliquat 336, can be highlighted as a preferred pair to provide very rapid $CH_3I$ decomposition. At the same time, substantial radiolytic re-oxidation of iodide to volatile iodine is avoided.

Figure 2:
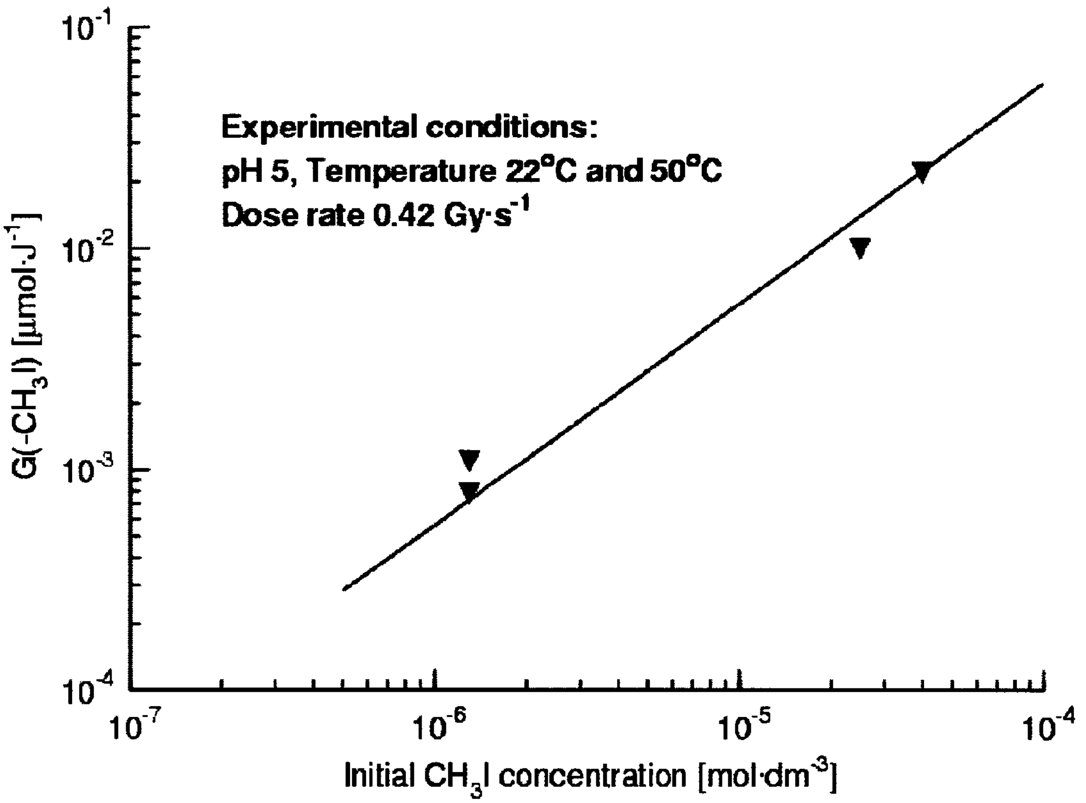
FIG. 2 illustrates the radialytic decomposition ($G(-CH_3I)$) dependence on initial $CH_3I$ concentration.
Figure 3:
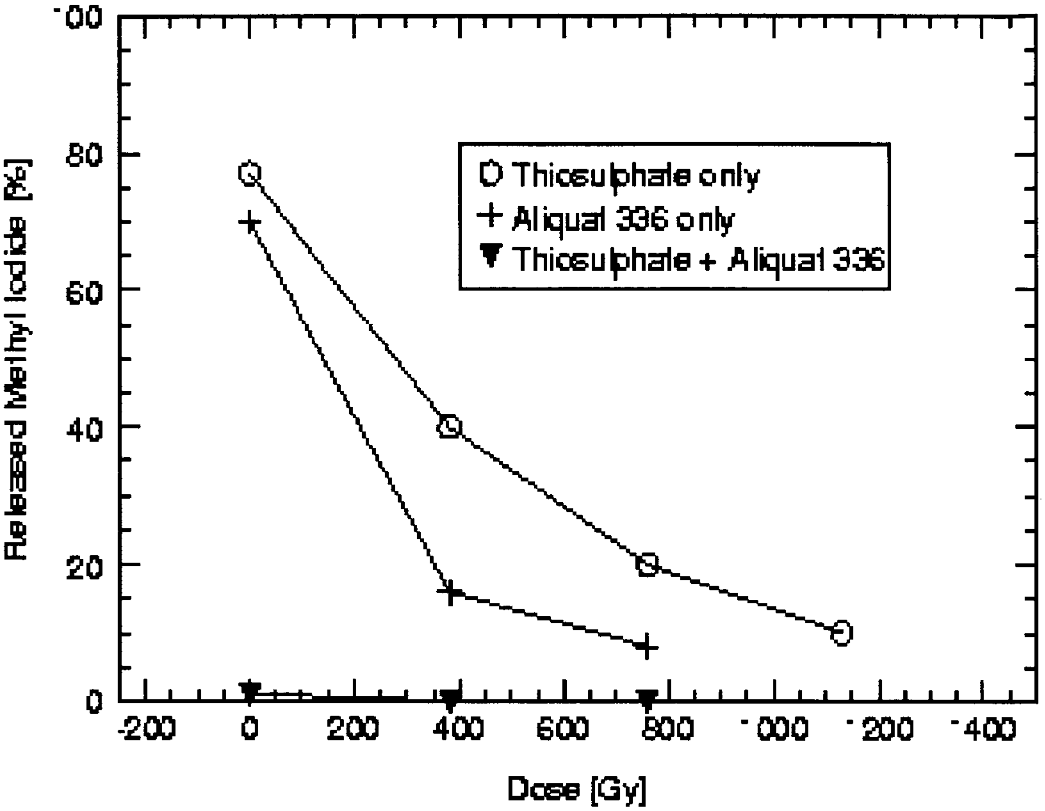
FIG. 3 illustrates the effect of additives on $CH_3I$ decomposition.

Table 1 and FIG. 3 show the relative enhancement of the decomposition by their simultaneous use. Since Aliquat 336 is a sparingly soluble and oily substance, concentrations have been paired with THS concentrations to obtain the optimum $CH_3I$ decomposition and retention of iodide ions at temperatures from 25° C. to 90° C. and from pH 3 to 9. The established database suggests the suitability for specific NPP applications (as described above with the scenarios 1 to 7) in which iodine is managed by retention in solution for containment venting filters, containment sprays and in the sump. Calculated and measured data with respect to the temperature dependency of the $CH_3I$ hydrolysis rate and to the radiolytic decomposition dependency on initial $CH_3I$ concentrations are shown in the FIGS. 1 and 2 resp.

Use of Aliquat 336 with another anion, such as carbonate or borate, has demonstrated similar decomposition and absorption efficiencies. Simultaneous use of Aliquat 336 with such a reducing agent can make its application during plant shut down feasible, that is, if management of iodine is an issue. If the attendant chloride ions in Aliquat 336 for such applications are undesirable, a chloride-free Aliquat 336 was prepared. Since Aliquat 336 significantly decomposes at high doses (>1 MGy) to form $CO_2$, its use as the co-additive would not be detrimental when both additives are not desired during normal power operation (as mentioned for scenario 2 above). Further investigations have shown that iodide-loaded Aliquat 336 absorbs onto selected, commercially available, solid phase inorganic materials, which facilitates an easy and efficient filtration for the management of iodine waste.

The PSI investigations provides a new method to reduce iodate, molecular iodine and also organic iodides into non-volatile iodide ions and further to bind them to suppress re-generation of volatile iodines. The experimental data can be used to improve and implement a variety of effective methods to cope with practical problems during NPP maintenance and severe reactor accidents.

TABLE 1

Comparative $CH_3I$ decomposition rates in aqueous mixtures of additives.

| $CH_3I$ solution composition | Reaction rates (arbitrary units) at temperatures: 22° C. | 70° C. | 90° C. |
|---|---|---|---|
| Additive-free | 1 | 3 x 10$^2$ | [1]1 x 10$^3$ |
| Thiosulphate | 3 x 10$^3$ | 7 x 10$^4$ | [1]1 x 10$^5$ |
| Thiosulphate + Aliquat 336 | 2 x 10$^4$ | 2 x 10$^5$ | [1]2 x 10$^5$ |

[1]At higher temperatures, significant $CH_3I$ fractions have accumulated in the gas space in the reaction vessel, which retard their decomposition in solution, i.e., the values probably represent minimum decomposition rates.

The invention claimed is:

1. A method for retaining volatile iodine compounds in an aqueous solution comprising the steps of:

providing an aqueous solution containing volatile iodine compounds;

adding a reducing agent to the aqueous solution for converting the volatile iodine compounds into non-volatile iodide ions; and adding a water-soluble ion-exchanger to the aqueous solution to adsorb the non-volatile iodide ions;

wherein the step of adding a reducing agent and the step of adding a water-soluble ion-exchanger are preformed simultaneously.

2. The method of claim 1, wherein the water-soluble ion-exchanger functions as a phase transfer catalyst for converting the volatile iodine compounds into non-volatile iodide ions.

3. The method of claim 2, wherein the water-soluble ion-exchanger is a long-chain quaternary amine.

4. The method of claim 2, wherein the water-soluble ion-exchanger is selected from the group consisting of trioctylmethylammonium chloride, trioctylmethylammonium carbonate, and trioctylmethylammonium borate.

5. The method of claim 1, wherein the reducing agent is selected from the group consisting of $Na_2S_2O_3$, $N_2H_5OH$, $NH_2OH$, $H_2C_2H_4SH$, $(NH_4)_2S$, HCOONa, and mixtures thereof.

6. The method of claim 1, further comprising the removing the water-soluble ion-exchanger with non-volatile iodide ions adsorbed thereon from the aqueous solution by filtering the aqueous solution with a solid phase inorganic material selected from the group consisting of $SiO_2$, $Al_2O_3$, $TiO_2$, and mixtures thereof.

7. The method of claim 1, wherein the volatile iodine compounds are radioactive.

* * * * *